United States Patent
Parks

(10) Patent No.: US 7,847,845 B2
(45) Date of Patent: Dec. 7, 2010

(54) IMAGE SENSOR WITH CHARGE MULTIPLICATION

(75) Inventor: Christopher Parks, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 12/407,314

(22) Filed: Mar. 19, 2009

(65) Prior Publication Data

US 2009/0180018 A1 Jul. 16, 2009

Related U.S. Application Data

(62) Division of application No. 10/939,140, filed on Sep. 10, 2004, now Pat. No. 7,522,205.

(51) Int. Cl.
*H04N 3/16* (2006.01)
*H04N 5/335* (2006.01)

(52) U.S. Cl. .................. 348/294; 348/323

(58) Field of Classification Search .......... 348/283, 348/294, 321, 323; 250/208.1
See application file for complete search history.

(56) References Cited

U.S. PATENT DOCUMENTS

| | | | |
|---|---|---|---|
| 4,912,536 A | 3/1990 | Lou | |
| 5,337,340 A * | 8/1994 | Hynecek | 257/217 |
| 5,656,835 A | 8/1997 | Komobuchi | |
| 6,278,142 B1 | 8/2001 | Hynecek | |
| 6,444,968 B1 * | 9/2002 | Burt et al. | 250/208.1 |
| 2002/0126213 A1 | 9/2002 | Hynecek | |
| 2002/0191093 A1 | 12/2002 | Hynecek | |
| 2003/0035057 A1 | 2/2003 | Hakamata et al. | |
| 2003/0042400 A1 | 3/2003 | Hynecek | |
| 2003/0223531 A1 | 12/2003 | Kashima et al. | |
| 2004/0150737 A1 | 8/2004 | Pool et al. | |
| 2004/0257438 A1 * | 12/2004 | Doguchi et al. | 348/65 |

* cited by examiner

*Primary Examiner*—Gevell Selby
(74) *Attorney, Agent, or Firm*—Nancy R. Simon

(57) ABSTRACT

An image sensor includes an array of pixels arranged into two or more subarrays and each subarray captures charge; and an output charge-coupled device that receives charge from the array of pixels; wherein the output charge-coupled device is divided into substantially two equal first and second portions in which either one portion receives charge from only one subarray or both portions receive charge respectively from a subarray, and the first portion of the charge-coupled device is a charge-multiplying charge-coupled device in which charge is amplified, and the second portion of the charge-coupled device does not amplify charge.

3 Claims, 4 Drawing Sheets

IMAGE SENSOR WITH CHARGE MULTIPLICATION

CROSS REFERENCE TO RELATED APPLICATION

This application is a divisional of U.S. patent application Ser. No. 10/939,140 filed Sep. 10, 2004 now U.S. Pat. No. 7,522,205.

FIELD OF THE INVENTION

The invention relates generally to the field of image sensors and, more particularly, to an image sensor with a charge multiplying charge-coupled device (CCD).

BACKGROUND OF THE INVENTION

FIG. 1 shows an example of an image sensor 10 with a charge multiplying CCD 40. The image sensor 10 consists of a pixel array 20 which may be of the well-known CCD types of full frame or interline. The pixel array 20 shifts row of charge into a horizontal serial CCD 30. The row of charge in the horizontal serial CCD 30 is shifted through a charge multiplying CCD 40 that amplifies the size of a charge packet by a factor 1 to 100. At the end of the charge multiplying CCD 40 is an output amplifier 50 that converts a charge packet into a measurable voltage.

FIG. 2 illustrates the operation of a prior art charge multiplying CCD. It consists of a repeating set of four control gates H1, H2, H3, and H4 separated from a silicon substrate 70 by a gate dielectric 60. The channel potential in the silicon substrate 70 is also drawn on FIG. 2. A large voltage is applied to gate H4 to produce a large channel potential. Gate H1 is at a low voltage to prevent two charge packets from mixing together. Gate H3 is held at a constant intermediate voltage while the voltage on gate H2 is decreased to a lower voltage. As the gate H2 voltage decreases the channel potential under gate H2 also decreases. This pushes the charge packet from under H2 through the gate H3 region where electrons enter the large channel potential region under gate H4. The large channel potential difference between gates H3 and H4 creates a large electric field in the silicon that accelerates the electrons to high enough energy to liberate additional electrons 80 from the silicon lattice. This is often called avalanche charge multiplication. This effect has a long history and details regarding its use in CCDs may be found in U.S. Pat. Nos. 4,912,536; 5,337,340; 5,656,835; 6,278,142; and 6,444,968; as well as US patent publications 2002/0126213A1; 2002/0191093A1; 2003/0035057A1; 2003/0042400A1; 2003/0223531A1; and 2004/0150737A1.

The common aspect of all the prior art is the requirement that a CCD be specially designed to implement a charge multiplying CCD. The present invention described hereinbelow shows how to operate an existing CCD as a charge multiplying CCD. The invention applies to commercially available CCD image sensors such as Eastman Kodak Company part numbers KAI-2020, KAI-2093, and KAI-4021. Use of existing image sensors as charge-multiplying CCDs costs less because there is no additional design or development required.

ADVANTAGEOUS EFFECT OF THE INVENTION

The present invention includes the advantage of operating existing CCD image sensors as charge-multiplying CCDs without fabrication of specially designed image sensors.

DETAILED DESCRIPTION OF THE INVENTION

Figure 3:
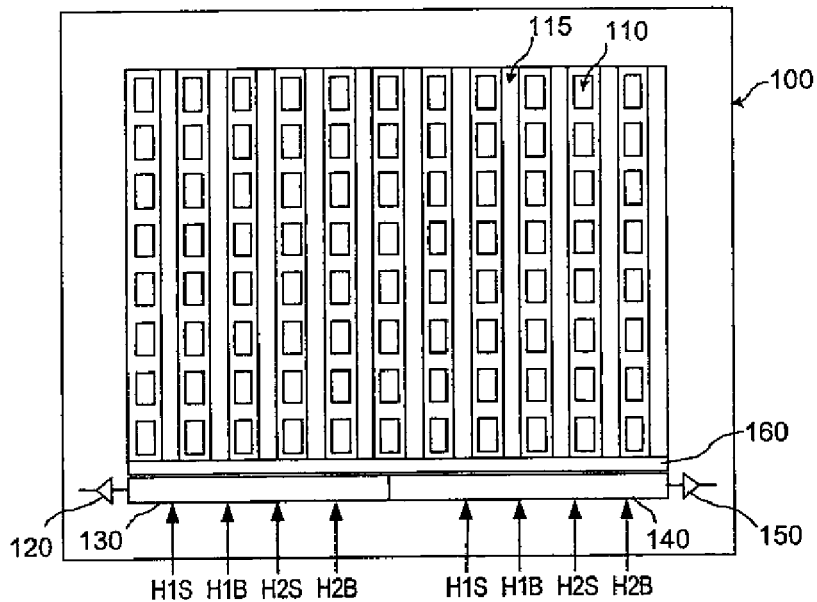
FIG. 3 is a view of a typical image sensor that is also reconfigured according to the present invention.

FIG. 3 shows the image sensor structure common to Eastman Kodak Company part numbers KAI-2020, KAI-2093, and KAI-4021. The image sensor 100 is an interline CCD comprised of an array of photodiodes 110. The photodiodes 110 receive photons that are converted to electrons and stored at the photodiode site 110 until the end of the image capture time. After image capture is complete, the electrons stored in the photodiode 110 are transferred to the parallel vertical CCDs 115. The vertical CCDs 115 are light shielded so that the electron charge packets may be read out of the CCDs without being corrupted by additional exposure to light. The vertical CCDs 115 shift the charge packets in parallel one row at a time towards the horizontal CCDs 130 and 140. In between the horizontal CCDs 130 and 140 and the vertical CCDs 115 is a fast dump row 160. The fast dump row 160 provides a means of discarding an entire row of charge packets without reading them out of the horizontal CCDs 130 and 140. Discarding rows of charge packets allows for faster image readout by skipping some rows if desired.

There are two horizontal CCDs; 130 is for the left half of the pixel array and 140 is for the right half of the pixel array. The horizontal CCDs are of the pseudo-2-phase type that allows the direction of charge transfer to be reversed. They both transfer charge to the left to read out the entire pixel array through only the left side output amplifier 120. Alternatively, the left horizontal CCD 130 can transfer charge to the left output amplifier 120, and the right horizontal CCD 140 can transfer charge to the right output amplifier 150. Using two outputs almost cuts the read out time in half Each horizontal CCD has its own independent set of charge transfer voltage control inputs H1S, H1B, H2S, and H2B. This dual horizontal CCD design is important for implementing charge multiplication. First, it is instructive to note normal horizontal CCD operation without charge multiplication.

Figure 4:
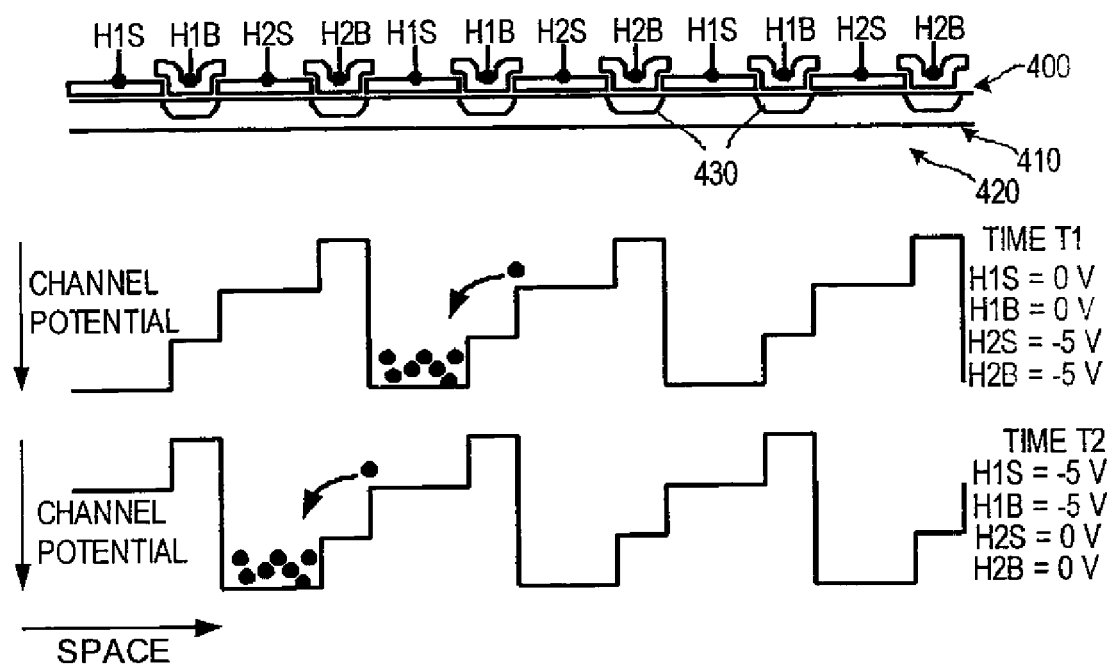
FIG. 4 is an illustration of typical horizontal CCD operation without charge multiplication.

FIG. 4 shows the horizontal CCD structure. The horizontal COD consists of a repeating sequence of charge transfer control gates HIS, H1B, H2S, and H2B. The gates are separated from the silicon surface by an insulating dielectric 400. The horizontal CCD implants consist of an n-type buried channel 410 in a p-type well or substrate 420. Underneath the gates H1S and H2B there is an extra light p-type implant 430. The implant 430 causes the channel potential under the H1B and H2B gates to be less tan the channel potential under the H1S and H2S gates even though they may have the same gate voltage. The implant 430 is often called a barrier implant and is present to facilitate control of the direction of charge transfer.

The normal clocking sequence of the horizontal CCD without charge multiplication is also shown in FIG. 4. At time T1 the H1S and H1B gates are at 0 V and the H2S and H2B gates are at −5 V. The charge packet always flows to the gates with the highest gate voltage (deepest channel potential). When the gate voltages are swapped at time T2 the charge packet advances forward by two gates. This is the normal low voltage operation of the horizontal CCD without charge multiplication.

Figure 5:
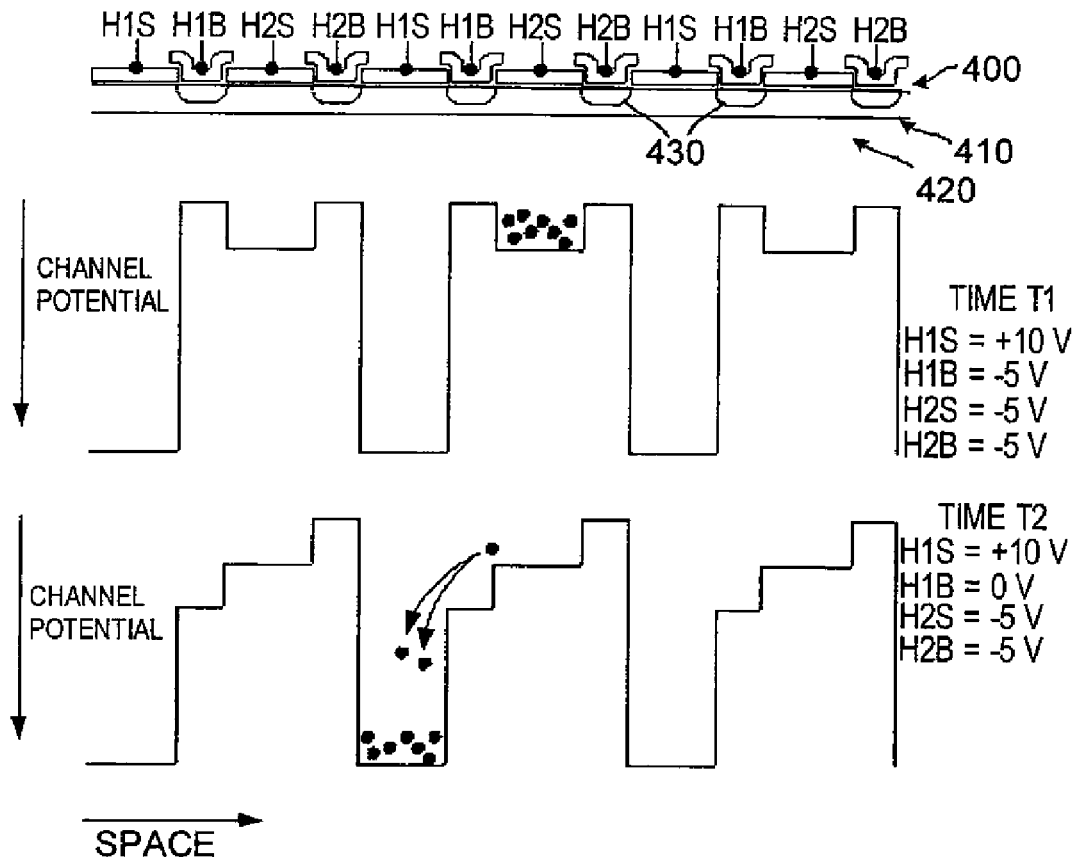
FIG. 5 is an illustration of charge multiplication horizontal CCD operation of present invention.

FIG. 5 shows how the same horizontal CCD shown in FIG. 4 may be operated as a charge multiplying CCD. The horizontal CCD in FIG. 5 has the same set of control gates H1S, H1B, H2S, and H2B as well as the same buried channel 410, barrier implants 430, and p-well 420. One of the significant differences is the timing and gate voltages. The charge multiplication process begins at time step T1 where H1B, H2S and H2B are all set at a low voltage of −5 V. The barrier implants 430 under H1B and H2B confine the charge packet to gate H2S until the gate H1S reaches its maximum voltage of +10 V. Then at time step T2 the H1B gate voltage is increased to +0 V to allow the charge packet to flow across the high electric field between gates H1S and H1S. The high electric field accelerates the electrons in the charge packet to high enough energy to liberate additional electrons from the silicon lattice and increase the size of the charge packet.

Figure 6:
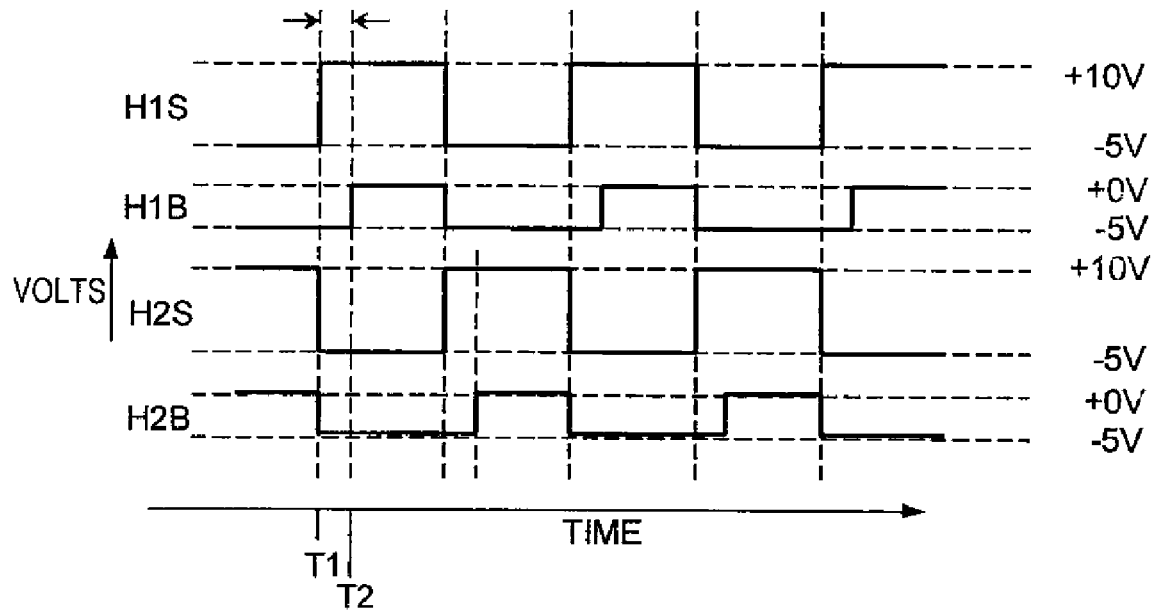
FIG. 6 is a timing diagram for charge multiplication horizontal CCD operation of the present invention.

The timing diagram for the gate voltages is shown in FIG. 6. The rising clock edges of H1B and H2B are delayed until the H1S and H2S rising edge transition is completed. The H1S and H2S clock amplitudes are +15 V. This amplitude is adjusted to select how much charge multiplication is to take place. Lower clock amplitudes will yield less charge multiplication.

Figure 1:
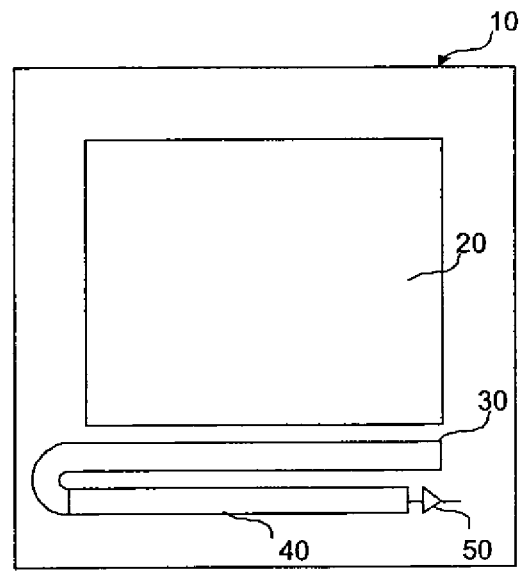
FIG. 1 is a prior art image sensor.
Figure 2:
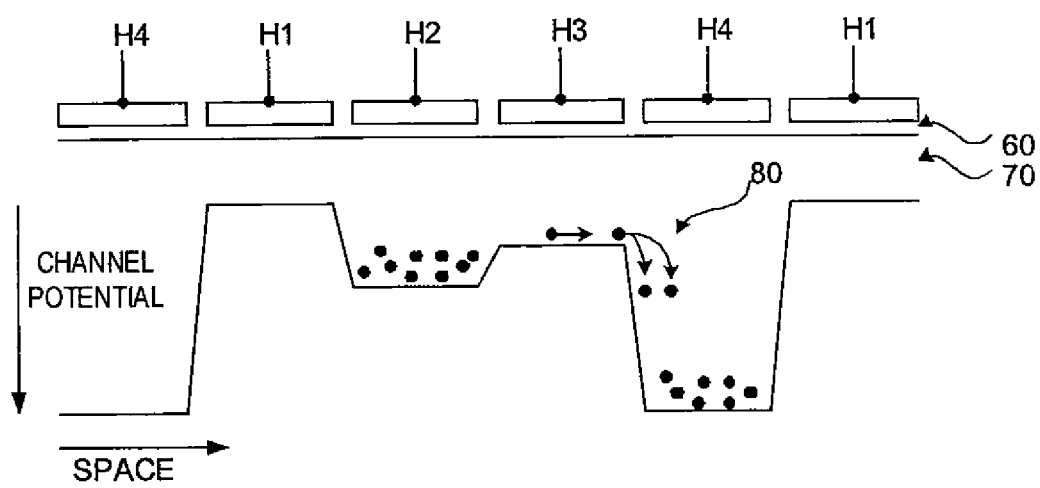
FIG. 2 is prior art charge multiplying CCD.

The clocking of FIGS. 5 and 6 is only applied to the left half horizontal CCD 130. The clocking of FIG. 4 is applied to the right half horizontal CCD 140. Charge from the left half vertical CCDs 115 that is transferred into the left half horizontal CCD 130 is read out but not used. The charge from the entire left half of the image sensor 100 will experience a non-uniform charge multiplication. This is because the left most pixel in the horizontal CCD 130 only passes through one charge multiplication transfer. While the right most pixel in the horizontal CCD 130 passes through many charge multiplication transfers, all of the charge in the right horizontal CCD 140 passes through the same number of charge multiplication transfers in the left horizontal CCD 130. Thus only the right side of the image sensor is used. This cuts the total resolution in half when the image sensor is operated in charge multiplication mode. This still provides an image sensor with a cost advantage over the specially designed image sensor of FIG. 1 because the full resolution image sensor of FIG. 3 is sold to other market segments that do not require charge multiplication. The larger volume of sales allows for lower net cost.

Figure 7:
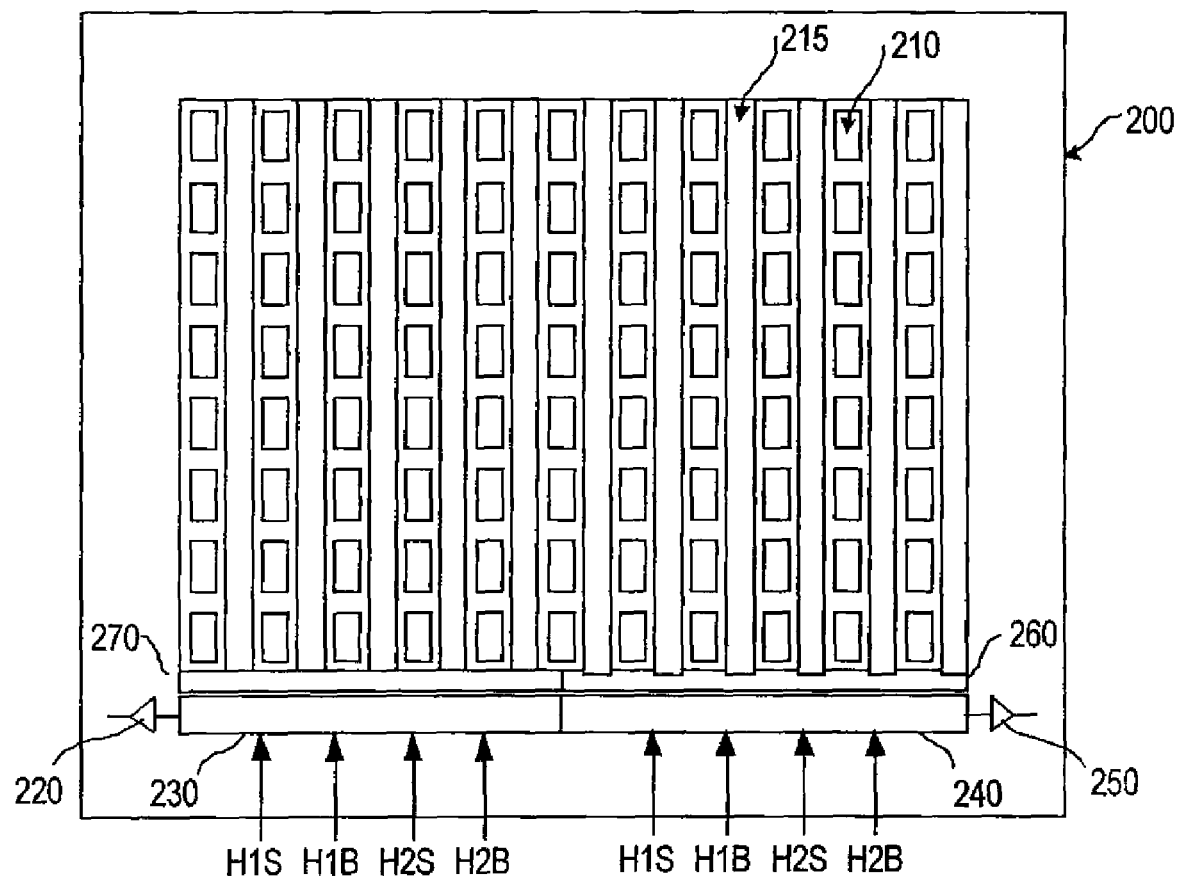
FIG. 7 is an illustration of an alternative embodiment of an image sensor capable of charge multiplication of the present invention.

FIG. 7 shows an alternative embodiment of the standard image sensor shown in FIG. 3 that is also reconfigured by the present invention. This image sensor 200 has an array of photodiodes 210 adjacent to vertical CCDs 215. There are left 230 and right 240 horizontal CCDs with their corresponding left 220 and right 250 output amplifiers. One of the primary differences between the image sensor 200 of FIG. 7 and the image sensor 100 of FIG. 3 is the fast dump row 160 is split into two halves 270 and 260. This is done so that when the left horizontal CCD 230 is operated in charge multiplication mode the left half fast dump 270 would be activated to prevent charge from transferring from the left half vertical CCDs 215 into the left horizontal CCD 230. The right half fast dump 260 would be deactivated. Therefore only the right half of each row can be transferred in to the right horizontal CCD 240. Now the right horizontal CCD 240 only has to be clocked for half the number of normal clock cycles. The number of clock cycles used is only enough to move the row of charge horizontally into the charge multiplying register 230. When the entire row is contained in the left half horizontal CCD 230, the next row may be transferred into the right half horizontal CCD 240 at which point there will be two rows of charge stored in the total length of the horizontal CCDs 230 and 240.

Figure 8:
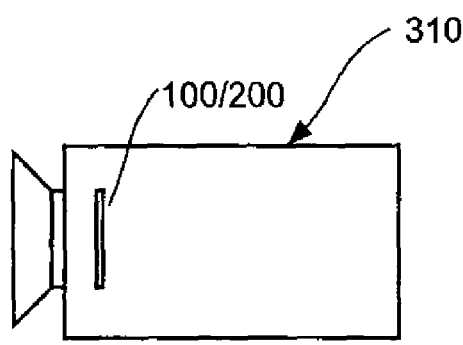
FIG. 8 is a side view of a digital camera for illustrating a typical commercial embodiment for the image sensor of the present invention.

FIG. 8 shows a digital camera 310 using an image sensor 100 or 200 in the charge-multiplying mode described above. The camera 310 would also include a means of switching between mode 1 which is full resolution normal readout without charge multiplication, and mode 2 which is half resolution readout with charge multiplication.

The invention has been described with reference to a preferred embodiment. However, it will be appreciated that variations and modifications can be effected by a person of ordinary skill in the art without departing from the scope of the invention.

PARTS LIST 10 image sensor
20 pixel arrays
30 horizontal serial CCD
40 charge multiplying CCD
50 output amplifier
60 gate dielectric
70 silicon substrate
80 charge packets/electrons
100 image sensor
110 photodiodes
115 parallel vertical CCDs
120 left output amplifier
130 left horizontal CCD
140 right horizontal CCD
150 right output amplifier
160 fast dump row
200 image sensor
210 photodiodes
215 vertical CCDs
220 left output amplifier
230 left horizontal CCD
240 right horizontal CCD
250 right output amplifier
260 right half fast dump row
270 left half fast dump row
310 digital camera
400 insulating dielectric
410 n-type buried channel
420 p-type well or substrate
430 extra light p-type implant
H1 control gates
H2 control gates
H3 control gates
H4 control gates
H1S charge transfer voltage control input/gate
H1B charge transfer voltage control input/gate
H2S charge transfer voltage control input/gate
H2B charge transfer voltage control input/gate

The invention claimed is:

1. A method for operating a charge-coupled device (CCD) image sensor as a charge multiplying CCD image sensor, wherein the CCD image sensor includes an array of pixels that captures charge and an output horizontal CCD that is divided into first and second portions that receive charge from the array of pixels, wherein a first set of alternating bather and non-bather control gates is disposed over the first portion of the output horizontal CCD and a second set of alternating bather and non-barrier control gates is disposed over the second portion of the output horizontal CCD with the barrier control gates in the first and second sets having a barrier implant disposed under each barrier control gate, the method comprising:

transferring charge directly from the array of pixels into the first and second portions of the output horizontal CCD;

multiplying charge within only the first portion of the horizontal CCD by applying a first set of clocking signals to only the first set of alternating barrier and non-barrier control gates disposed over the first portion of the horizontal CCD, wherein the first set of clocking signals comprises a first clocking signal having a first amplitude and a second clocking signal having a second amplitude different from the first amplitude, wherein the first clocking signal is applied to respective non-barrier control gates and the second clocking signal to respective adjacent barrier control gates with a rising edge of the second clocking signal occurring after a rising edge and before a falling edge of the first clocking signal.

2. The method as in claim 1, further comprising applying a second set of clocking signals different from the first set of clocking signals to only the second set of alternating bather and non-barrier control gates disposed over the second portion of the horizontal CCD.

3. The method as in claim 1, further comprising adjusting the amplitude of the first clocking signal prior to transferring charge directly from the array of pixels into the first and second portions of the output horizontal CCD.

* * * * *

UNITED STATES PATENT AND TRADEMARK OFFICE
CERTIFICATE OF CORRECTION

PATENT NO. : 7,847,845 B2  Page 1 of 1
APPLICATION NO. : 12/407314
DATED : December 7, 2010
INVENTOR(S) : Christopher Parks It is certified that error appears in the above-identified patent and that said Letters Patent is hereby corrected as shown below:

| Issued Patent | | Description of Error |
|---|---|---|
| Column | Line | |
| 5 | 4 | In Claim 1, delete "bather" and insert -- barrier --, therefor. |
| 5 | 5 | In Claim 1, delete "bather" and insert -- barrier --, therefor. |
| 5 | 7 | In Claim 1, delete "bather" and insert -- barrier --, therefor. |
| 6 | 11 | In Claim 2, delete "bather" and insert -- barrier --, therefor. |

Signed and Sealed this
Sixteenth Day of August, 2011

David J. Kappos
*Director of the United States Patent and Trademark Office*